US010747875B1

(12) United States Patent
Stoler (10) Patent No.: US 10,747,875 B1
(45) Date of Patent: Aug. 18, 2020

(54) CUSTOMIZING OPERATING SYSTEM KERNELS WITH SECURE KERNEL MODULES

(71) Applicant: CyberArk Software Ltd., Petach-Tikva (IL)

(72) Inventor: Nimrod Stoler, Zoran (IL)

(73) Assignee: CyberArk Software Ltd., Petach-Tikva (IL)

(*) Notice: Subject to any disclaimer, the term of this patent is extended or adjusted under 35 U.S.C. 154(b) by 0 days.

(21) Appl. No.: 16/823,932

(22) Filed: Mar. 19, 2020

(51) Int. Cl.
*G06F 21/54* (2013.01)
*G06F 21/57* (2013.01)
*G06F 21/31* (2013.01)
*G06F 21/53* (2013.01)

(52) U.S. Cl.
CPC .............. *G06F 21/54* (2013.01); *G06F 21/31* (2013.01); *G06F 21/53* (2013.01); *G06F 21/577* (2013.01)

(58) Field of Classification Search
CPC .................................. G06F 21/54; G06F 21/53
See application file for complete search history.

(56) References Cited

U.S. PATENT DOCUMENTS

| 6,397,331 | B1* | 5/2002 | Ober | G06F 8/60 713/164 |
| 8,468,600 | B1* | 6/2013 | Kaskel | G06F 21/53 726/22 |
| 2003/0226014 | A1* | 12/2003 | Schmidt | G06F 21/57 713/164 |
| 2005/0091502 | A1* | 4/2005 | Cargille | G06F 21/6281 713/182 |
| 2008/0301440 | A1* | 12/2008 | Plouffe, Jr. | G06F 21/51 713/164 |
| 2009/0089579 | A1* | 4/2009 | Murase | G06F 21/575 713/164 |
| 2013/0167222 | A1* | 6/2013 | Lewis | G06F 21/53 726/17 |
| 2014/0033304 | A1* | 1/2014 | Lewis | G06F 21/53 726/22 |

(Continued)

FOREIGN PATENT DOCUMENTS

WO WO 2013/142948 A1 10/2013

OTHER PUBLICATIONS

Communication and Search Report, issued from the European Patent Office in corresponding Application No. 20171412.8-1218, dated May 25, 2020 (7 pages).

*Primary Examiner* — Bradley W Holder
(74) *Attorney, Agent, or Firm* — Finnegan, Henderson, Farabow, Garrett & Dunner, LLP (57) ABSTRACT

Disclosed embodiments relate to secure and reliable customization of operating system kernels. Techniques include configuring a kernel security module for loading to an operating system kernel to run kernel-level scripts on the kernel, the kernel security module being configured to perform a security verification comprising operations of: identifying, at the kernel security module, a script received at the kernel security module for requested execution by the kernel, and verifying whether the script has a valid signature; determining, at the kernel security module and based on the security verification, whether to permit the script to be processed by the kernel; and identifying, based on the determining, executable code corresponding to the script to execute at the kernel.

20 Claims, 8 Drawing Sheets

(56) References Cited

U.S. PATENT DOCUMENTS

| | | | |
|---|---|---|---|
| 2016/0043869 A1* | 2/2016 | Smith | H04L 9/30 |
| | | | 713/176 |
| 2016/0283404 A1* | 9/2016 | Xing | G06F 12/1009 |
| 2017/0091468 A1* | 3/2017 | Demchenko | G06F 21/53 |
| 2017/0288878 A1 | 10/2017 | Lee et al. | |
| 2019/0026095 A1 | 1/2019 | Mukhopadhyay et al. | |

* cited by examiner

CUSTOMIZING OPERATING SYSTEM KERNELS WITH SECURE KERNEL MODULES

BACKGROUND

Operating system kernels are fundamental components of computing systems. Kernels interface on the one hand with computer hardware (e.g., memories, processors, and input/output devices), and on the other hand with applications that are configured to perform certain software operations. Kernels are configured to manage memory usage on a computing system, application operations, network communications, and input/output interface communications.

Existing usage of operating system kernels, however, is in many instances insecure. For example, credentials and other secrets are vulnerable to copying by malicious users when they are stored in system memory. Credential theft may also occur when credentials or other secrets are in transit from one process to another. In addition, privilege escalation attacks are significant vulnerabilities. For example, when a user or process is granted higher-level privileges (e.g., administrator privileges, such as through an IT task), the higher-level privileges may become vulnerable to theft.

In view of these vulnerabilities in existing usages of operating system kernels, it may be advantageous to modify the kernel to enhance security. For example, one option may be to build an entirely new operating system kernel with security enhancements built into it. While this theoretically may sound attractive, in practice it is not feasible. Developing and maintaining a large volume of code, as would be required for many different kernels, is not practical. Merging kernel changes into a kernel's code (e.g., the Linux kernel's code) may be another approach, but this would take many months or even years, if the code is incorporated at all. Similarly, it may be possible to use Berkeley Packet Filters (BPFs) or extended BPFs (eBPFs) to modify the operation of kernels. For example, an eBPF may operate as a virtual machine that has special commands, resources, and restrictions. Nevertheless, eBPFs often have strict restrictions and are not easily usable for purposes of security enhancement. A further approach may involve using kernel modules that are dynamically loaded into an operating system kernel (e.g., just as hardware drivers are loaded and executed in the context of a kernel). Nevertheless, because such modules would essentially be code executed inside the kernel, they would be extremely susceptible to destabilize the kernel (e.g., cause the kernel to crash). Indeed, software modules may be flawed in terms of bad programming (e.g., endless loops, stack overflow, memory issues, etc.) that lead to errors or crashes by the kernel.

In view of the deficiencies in existing usage of operating system kernels, technological solutions are needed for enhancing security in kernel-based computing environments. Advantageously, technological solutions should allow for a kernel module to serve as a virtual machine sandbox for incoming scrips. The module may implement a defined set of executable commands and memory locations available for scripts running inside the sandbox. The executable commands and memory locations may be rigorously tested in terms of kernel stability before the module is deployed. Through these techniques, as further discussed below, kernel security may be enhanced and credentials that are stored on or passed through a computing system may be much more securely managed. Accordingly, the disclosed techniques may significantly reduce threats of credential theft and misuse, while at the same time being deployed in an efficient manner that does not up the proper functioning of a kernel.

SUMMARY

The disclosed embodiments describe non-transitory computer readable media, systems, and methods for secure and reliable customization of operating system kernels. For example, in an exemplary embodiment, there may be a non-transitory computer readable medium including instructions that, when executed by at least one processor, cause the at least one processor to perform operations for secure and reliable customization of operating system kernels. The operations may comprise configuring a kernel security module for loading to an operating system kernel to run kernel-level scripts on the operating system kernel, the kernel security module being configured to perform a security verification comprising operations of: identifying, at the kernel security module, a script received at the kernel security module for requested execution by the operating system kernel, and verifying whether the script has a valid signature; determining, at the kernel security module and based on the security verification, whether to permit the script to be processed by the operating system kernel; and identifying, based on the determining, executable code corresponding to the script to execute at the operating system kernel.

According to a disclosed embodiment, identifying the executable code comprises accessing a defined set of executable code maintained by the kernel security module.

According to a disclosed embodiment, the defined set of executable code has been debugged for stable execution at the operating system.

According to a disclosed embodiment, the kernel security module is further configured to identify a software update process for target software configured for execution on the operating system kernel; and lock at least a portion of a memory used by target software during the software update process.

According to a disclosed embodiment, the kernel security module is further configured to determine a level of privileged access associated with the target software, and apply a least-privilege policy to lower the level of privileged access associated with the target software.

According to a disclosed embodiment, applying the least-privilege policy includes provisioning a privileged access credential to the target software.

According to a disclosed embodiment, applying the least-privilege policy includes including an identity associated with the target software in a privileged membership group.

According to a disclosed embodiment, the kernel security module is further configured to determine whether to allow the target software to access a requested file in a filesystem associated with the operating system kernel.

According to a disclosed embodiment, the operations further comprise: identifying a request from a new script to bind to a restricted port number associated with the operating system kernel; performing a security verification for the new script; and allowing, on a just-in-time basis and based on a result of the security verification, the request to bind to the restricted ported number.

According to a disclosed embodiment, the operations further comprise: identifying a termination of the binding to the restricted port number; and reverting to a default state where requests to bind to the restricted port number are denied.

According to another disclosed embodiment, a method may be implemented for secure and reliable customization of operating system kernels. The method may comprise configuring a kernel security module for loading to an operating system kernel to run kernel-level scripts on the operating system kernel, the kernel security module being configured to perform a security verification comprising operations of: identifying, at the kernel security module, a script received at the kernel security module for requested execution by the operating system kernel, and verifying whether the script has a valid signature; determining, at the kernel security module and based on the security verification, whether to permit the script to be processed by the operating system kernel; identifying, based on the determining, executable code corresponding to the script to execute at the operating system kernel.

According to a disclosed embodiment, verifying whether the script has the valid signature includes accessing a cryptographic key maintained by the kernel security module and attempting to decrypt at least a portion of the script.

According to a disclosed embodiment, the method further comprises, conditional on the security verification, determining whether to decrypt encrypted data associated with the script.

According to a disclosed embodiment, the encrypted data is an encrypted version of a privileged access credential.

According to a disclosed embodiment, the method further comprises providing a decrypted version of the encrypted data to the script.

According to a disclosed embodiment, the method further comprises identifying a request to debug the script.

According to a disclosed embodiment, the method further comprises blocking the request to debug the script.

According to a disclosed embodiment, the method further comprises identifying a port number of the operating system kernel associated with the requested execution.

According to a disclosed embodiment, the method further comprises determining whether the identified port number is within a restricted range.

According to a disclosed embodiment, the method further comprises blocking execution of the process by the operating system kernel when the identified port number is within the restricted range.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

In accordance with disclosed techniques, a software module may be implemented with an operating system kernel in order to provide enhanced security. In contrast to current uses of operating system kernels, in which credentials and other secrets are subject to theft when stored in memory or passed in transit between processes, the disclosed techniques secure such credentials and secrets. As described further below, a kernel module may be implemented together with a kernel to provide a virtual machine sandbox for incoming scripts. The kernel module may use a predefined set of executable commands and memory locations available for scripts running inside the sandbox. Further, the kernel module's executable commands and memory locations will be rigorously tested and debugged to ensure that they do not affect the stability of the operating system kernel. In contrast to unreliable or unstable kernel add-on code, the kernel module will not affect the proper operation of the operating system kernel. These and other technological improvements are discussed further below.

Reference will now be made in detail to the disclosed embodiments, examples of which are illustrated in the accompanying drawings.

Figure 1:
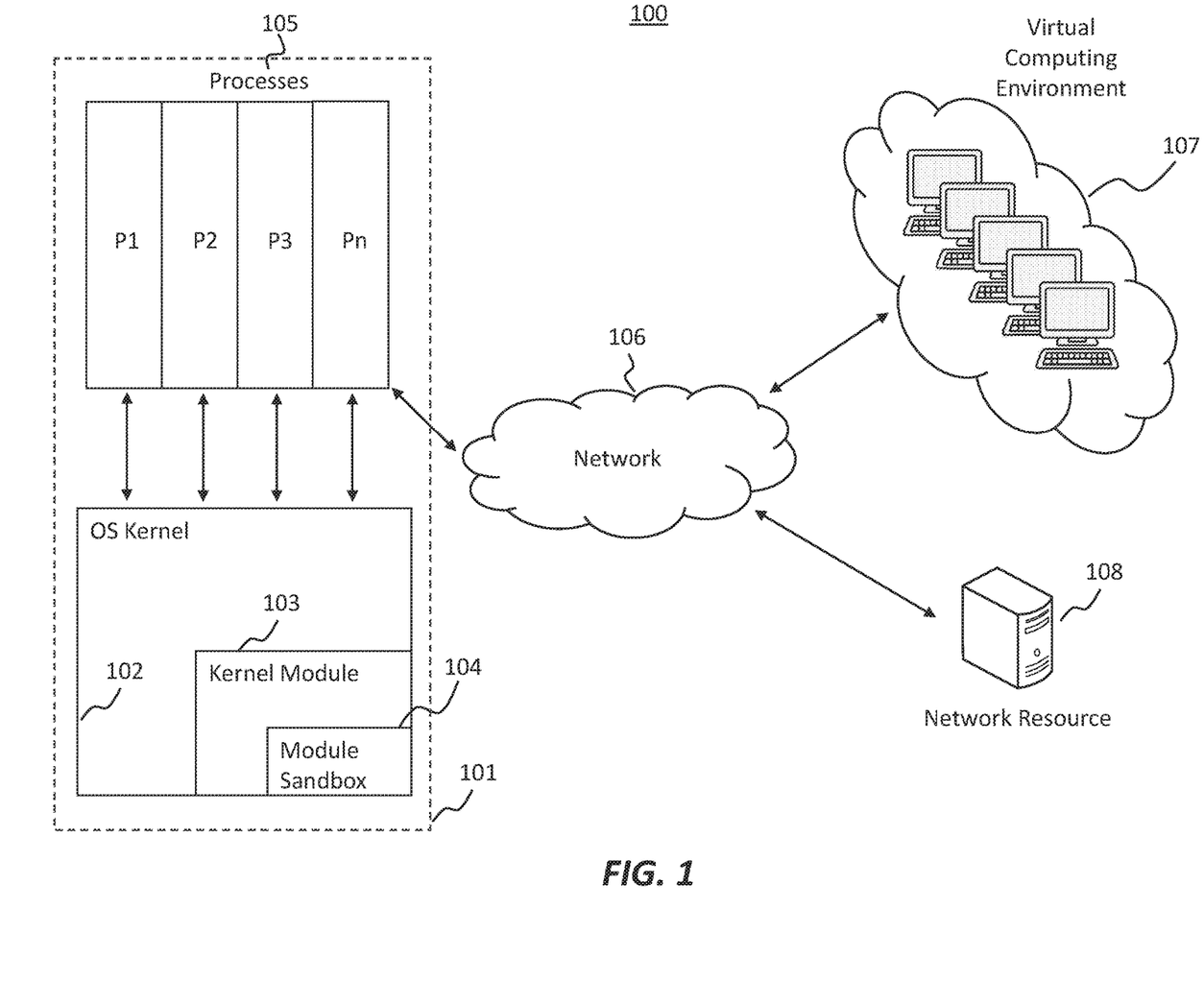
FIG. 1 is a block diagram of an exemplary system for secure and reliable customization of operating system kernels in accordance with disclosed embodiments.

FIG. 1 is a block diagram of an exemplary system 100 for implementing secure and reliable customization of operating system kernels. In accordance with system 100, a computing resource 101 may include an operating system kernel 102 and one or more processes P1-Pn 105. In some embodiments, the operating system kernel 102 may be a Linux kernel. Of course, other alternative operating system types are possible too (e.g., Windows™ operating system, Unix™ operating system, Apple IOS™ operating system, etc.). The processes 105 may make system calls to the operating system kernel 102 in order to perform computing tasks on computing resource 101 (e.g., reading from memory, writing to memory, accessing a network adapter, interfacing with external peripheral devices, using a processor of computing resource 101 for executing instructions, etc.). In some embodiments, processes 105 may communicate with external network resources as well, such as instances within virtual computing environment 107 or network resource 108. Such communications may occur via network 106.

As described further below, when processes 105 may send system calls or scripts to operating system kernel 102, the system calls or scripts may be redirected (e.g., through an operating system hook) to kernel module 103, or may be intercepted by kernel module 103. Kernel module 103 may operate as a virtual machine sandbox for incoming system calls or scripts. Scripts that are received at kernel module 103 may be able to use a predefined set of executable commands and memory locations, which will be tested for stability so as not to destabilize the operating system kernel 102. In some embodiments, kernel module 103 only allows these defined and tested executable commands to be passed to kernel 102 for execution by kernel 102. For example, the executable commands may be stored by kernel module 103 as a whitelist or defined set. This may help ensure both system security and system stability. The kernel module 103 may also verify or authenticate processes 105 before they are permitted to run on operating system kernel 102. These and other techniques are discussed in more detail below.

Computing resource 101 may be one or more of a wide variety of computing devices, such as desktop computers, laptops, tablets, smartphones, smart clothing, computer-embedded jewelry, various types of IoT devices, and other network-connected devices. In accordance with disclosed embodiments, computing resource 101 may have one or more hardware processor, memory, and network adapter. Such a network adapter may enable the computing resource 101 to communicate across network 106, which may be, or may include, the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network (e.g., 4G, 5G, etc.), an enterprise or private data network, a storage area network, a virtual private network using a public network, a nearfield communications technique (e.g., Bluetooth™, infrared, etc.), or various other types of network communications. As described below, processes 105 of computing resource 101 may communicate via such a network adapter across network 106 with one or more instances in virtual computing environment 107 or with an on-premises network resource 108.

In some embodiments, computing resource 101 may be implemented as a dynamic router or firewall. For example, computing resource 101 may perform the techniques described below involving the kernel module 103 to allow only a particular process among processes 105 to send or receive information over network 106. In other embodiments, computing resource 101 may be configured to protect credentials and other secrets while they are in transit across network 106. For example, using the techniques discussed below for kernel module 103, computing resource 101 may reroute certain network communications through kernel module 103's sandbox 104, and ensure that the credentials and secrets being transmitted are encrypted while in transit. This technique additionally guards against credential theft, in contrast to existing techniques that expose credentials and other secrets in plaintext (i.e., not encrypted) while in transit. According to such existing techniques, security vulnerabilities arise because the plaintext credentials may be retrieved by attackers via memory dump processes or debugging tools. The disclosed techniques protect against such attacks. In a further implementation, computing resource 101 may monitor processes 105 and perform surveillance regarding the operations of such processes 105. For example, using kernel module 103, all running processes 105 may be tracked. In addition, kernel module 103 may ensure that processes 105 are not receiving more privileges than they need. In order to accomplish this, in some embodiments kernel module 103 may store (or access externally) a least-privilege profile for each of processes 105, which may specify a minimal level (e.g., scope and/or duration) of privileged rights available to each of processes 105. Using such least-privilege profiles, each process 105 may use only its minimally acceptable level of privileges, and not unnecessarily strong or long-lasting privileges. In addition, in some embodiments the least-privilege policy for each of processes 105 may be implemented on a just-in-time (JIT) basis. For example, this may involve creating accounts (e.g., temporary privileged accounts for use by processes 105), groups (e.g., privileged membership groups for inclusion of processes 105), credentials or secrets (e.g., for use by, or on behalf of, processes 105), or other techniques of allocating privileges at the moment they are needed (and not before).

As shown in system 100, kernel module 103 may manage module sandbox 104, which may be a secure memory space. In some embodiments, module sandbox 104 may be a memory space in the same memory of computing resource 101 that is accessed by operating system kernel 102, but that is reserved for use exclusively by kernel module 103. For example, module sandbox 104 may be defined as a set of memory addresses or locations that are exclusively assigned to kernel module 103, and not accessible to operating system kernel 102 itself. In alternate embodiments, kernel module 103 may be configured such that module sandbox 104 is a separate memory (e.g., separate hardware) from the memory used by operating system kernel 102. In either of these implementations, or others, module sandbox 104 may operate as discussed further below to temporarily store secrets and other credentials in connection with the operation of kernel module 103. The secrets and other credentials may be encrypted in some embodiments for added security. Using these techniques, even if an attacker is able to perform a memory dump on the memory of computing resource 101 that is used by operating system kernel 102, the attacker will not obtain the contents of module sandbox 104. And even if the attacker is somehow able to obtain the contents of module sandbox 104, the contents may still, in some embodiments, be encrypted.

Virtual computing environment 107 may include one or more of different types of virtual computing instances. For example, virtual computing environment 107 may include one or more virtual machines, container instances, or other types of virtualized instances, which may be based on virtualization tools provided by Amazon Web Services™ (AWS™), Microsoft Azure™, IBM Cloud™, Docker™, Google Cloud Platform™, Cisco Metapod™, Joyent™, vmWare™, or various others. In some embodiments, virtual computing environment 107 may have virtualized instances that are configured to communicate with computing device 101 (e.g., via one or more of processes 105).

In some embodiments, virtual computing environment 107 may be created or controlled by a virtual environment orchestrator, which may be based on platforms such as AppFormix™, BMC Cloud LifeCycle Management™, IBM Cloud Orchestrator™, AWS CloudFormation™, Kubernetes™, or others. In other embodiments, virtual computing environment 107 may be a robotic automation platform for robotic process automation. The robotic automation platform may be based on tools such as Blue Prism™, UiPath™, Pega™, Verint™, or others. In additional embodiments, virtual computing environment 107 may be based on, or interface with, a continuous development or continuous deployment (e.g., DevOps) environment. For example, a virtual environment orchestrator for environment 107 may run a DevOps or other automation tool (such as Jenkins™ Kubernetes™, Ansible™, Chef™, Puppet™, Bamboo™, VMware ESKi™, etc.) to continuously build, test, and deploy code or to perform other automation functions.

As shown in system 100, network resource 108 may be an on-premises network resource such as a server, database, firewall, IoT device, computer, or other type of network-accessible device. Like instances in virtualized environment 107, network resource 108 may also be configured for communication with one or more of processes 105 via network 106.

Figure 2A:
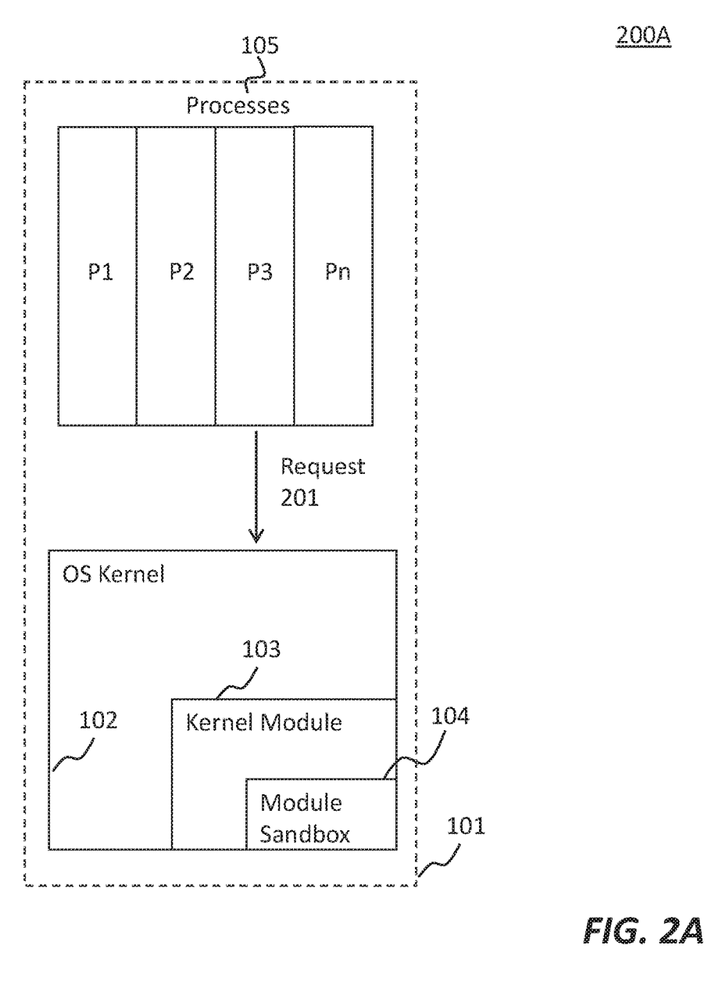
FIG. 2A is a block diagram of an exemplary system where a process makes a request to an operating system kernel in accordance with disclosed embodiments.

FIG. 2A is a block diagram of an exemplary system 200A where a process P3 makes a request 201 to an operating system kernel 102 in accordance with disclosed embodiments. The request 201 may take various different forms. As an example, process P3 may be configured to read a credential file (e.g., "cred.txt") which may be stored in memory of computing resource 101, and not in kernel module sandbox 104. The process P3 may be programmed to read the credential file and use the credentials from the file to access a remote network resource (e.g., an instance in virtualized environment 107 or network resource 108). The remote network resources may be access-protected and may require such a credential for access by the process P3. Accordingly, in this example, the request 201 may be process P3 requesting access to the credential "cred.txt" stored in memory on computing resource 101. Various other types of request 201 are possible as well. For example, in some embodiments the initial start-up or execution of process P3 may be deemed the request 201. Further, a user completing a log-in or authentication procedure associated with process P3 may be deemed the request 201 in some embodiments. Other implementations of the request 201 are possible as well.

In some embodiments, the credential (e.g., "cred.txt") may be stored in an encrypted form on memory of computing resource 101. Thus, any request by process P3 to read the credential may return only the encrypted version of the credential (not the plaintext version). According to various embodiments, the encryption of the credential may be symmetric (e.g., using a single encryption key) or asymmetric (e.g., using a private/public key pair).

Figure 2B:
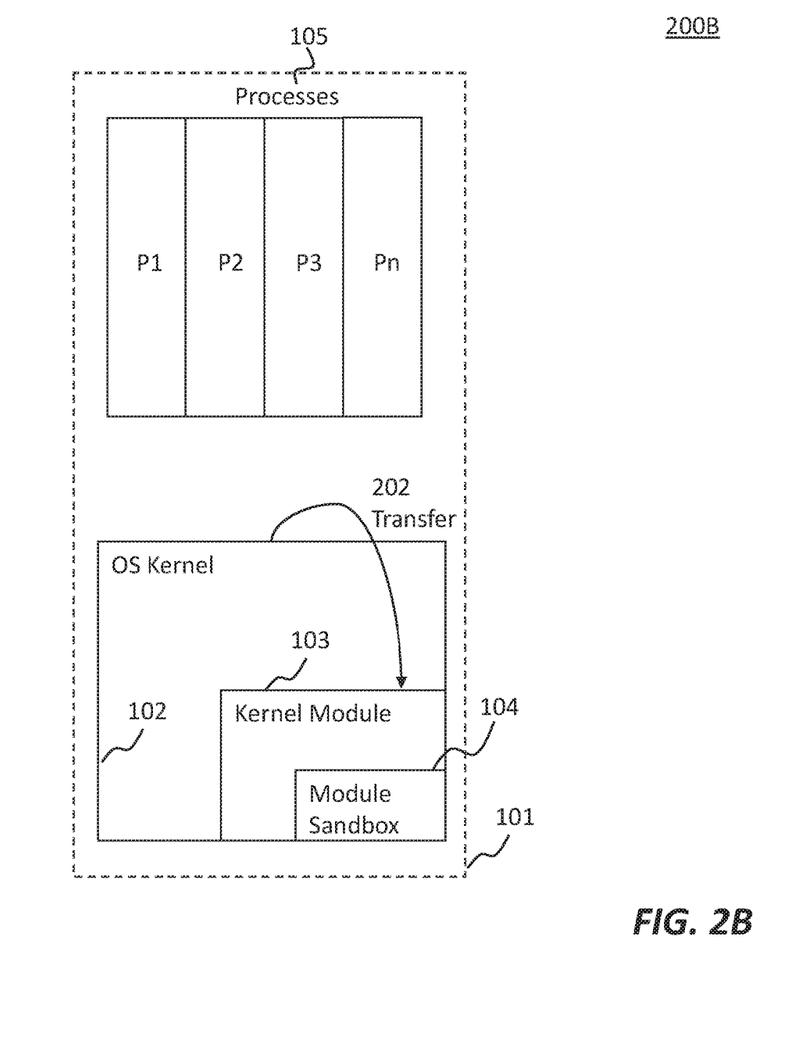
FIG. 2B is a block diagram of an exemplary system where a request from a process is transferred to a kernel module in accordance with disclosed embodiments.

FIG. 2B is a block diagram of an exemplary system 200B where a request 201 from a process P3 is transferred to a kernel module 103 in accordance with disclosed embodiments. For example, if a script associated with process P3 is loaded to the kernel module sandbox 104 and it requests to read the credential (e.g., "cred.txt"), it may hook to the "read( )" system call. Based on this request 201, the request 201 may be transferred by operating system kernel 102 in operation 202 to the kernel module 103. For example, the transfer operation 202 may occur based on an operating system hooking operation or an interception operation by kernel module 103. Further, in some embodiments the transfer 202 of the request 201 may involve kernel module querying whether it has a stored and tested executable command (or commands) that are associated with the request 201. For example, in embodiments where kernel module 103 maintains defined and tested (e.g., debugged and stabilized) executable commands, kernel module 103 may query whether t has one or more such vetted commands that correspond to request 201 (e.g., based on a cross-reference table, look-up table, machine learning technique, etc.).

Figure 2C:
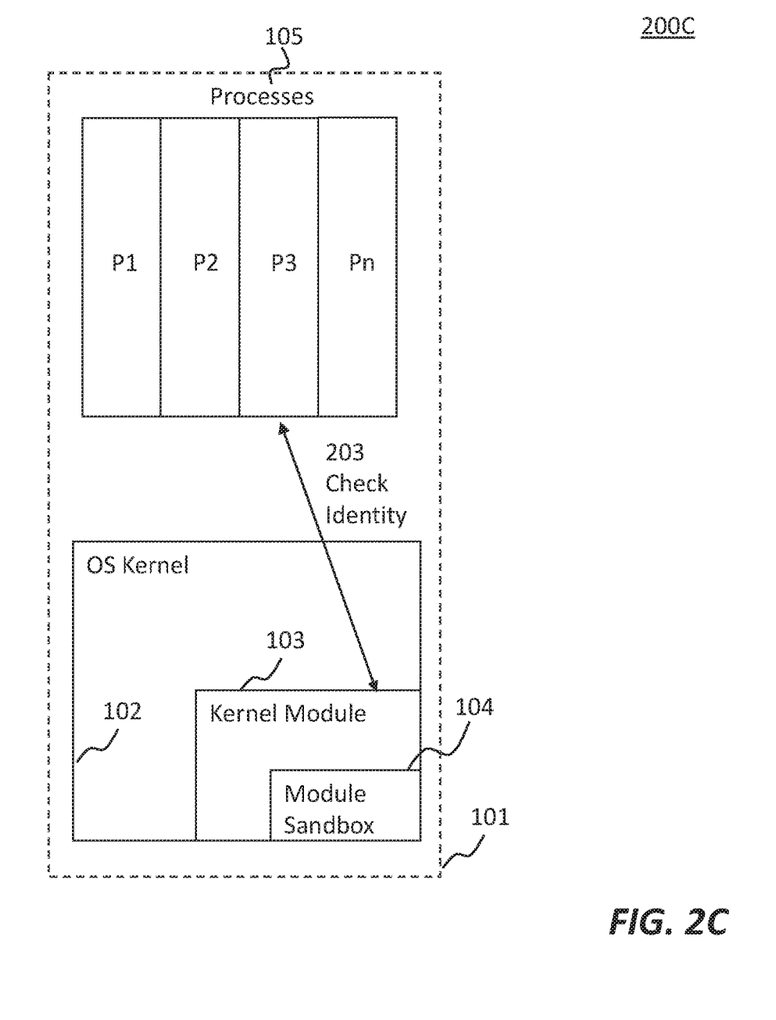
FIG. 2C is a block diagram of an exemplary system where a kernel module verifies an identity of a process in accordance with disclosed embodiments.

FIG. 2C is a block diagram of an exemplary system 200C where a kernel module 103 verifies an identity of a process P3 in operation 203 in accordance with disclosed embodiments. For example, in some embodiments kernel module 103 may be configured to only load scripts that have been signed by a trusted authority. For example, in some implementations the scripts received at kernel module sandbox 104 may be signed with an asymmetric public key. In that case, kernel module 103 may access a corresponding asymmetric private key (e.g., from kernel module sandbox 104) and use the private key to verify the signature of the script. In alternative embodiments, a symmetric key may be used to sign the script, and in that case the kernel module 103 may access a corresponding copy of the symmetric key (e.g., from kernel module sandbox 104) to verify the signature of the script. In this manner, the kernel module 103 may only load scripts from the kernel module sandbox 104 that have a valid signature. Further, kernel module 103 may validate the contents of the script's owner or creator.

In additional embodiments, kernel module 103 may calculate a hash of process P3 itself and compare the hash value with a known valid value of the hash. This may enable kernel module 103 to validate the identity of the process P3 itself. In order to perform this hash comparison, kernel module 103 may store (e.g., in sandbox memory 104) a table associating processes 105 with valid hash values. An example of such a table is shown below, where the hash values are created using the MD5 hashing technique. Of course, various other hashing techniques are possible as well (e.g., MD4, SHA-1, SHA-2, etc.).

| Process | Valid Hash |
|---------|------------|
| P1 | b408630049d9a607f189ef62a38a47c5 |
| P2 | 8dc01b0de0431cb7eced92277c1f04c7 |
| P3 | e842795b282293fd61bc294c49edb12b |
| P4 | c44ab68f3a5ef32c8dfbbaa1daa86f98 |
| Pn | ... |

In addition, in some embodiments kernel module 103 may verify the identity of the requesting process P3 in other ways. For example, process P3 may have a unique process name, number, or ID value. In such embodiments, a table similar to the above table may be maintained by kernel module 103 that lists known and valid processes 105 (e.g., as a whitelist table). In this manner, processes that are not included in the table may not be validated by kernel module 103.

Figure 2D:
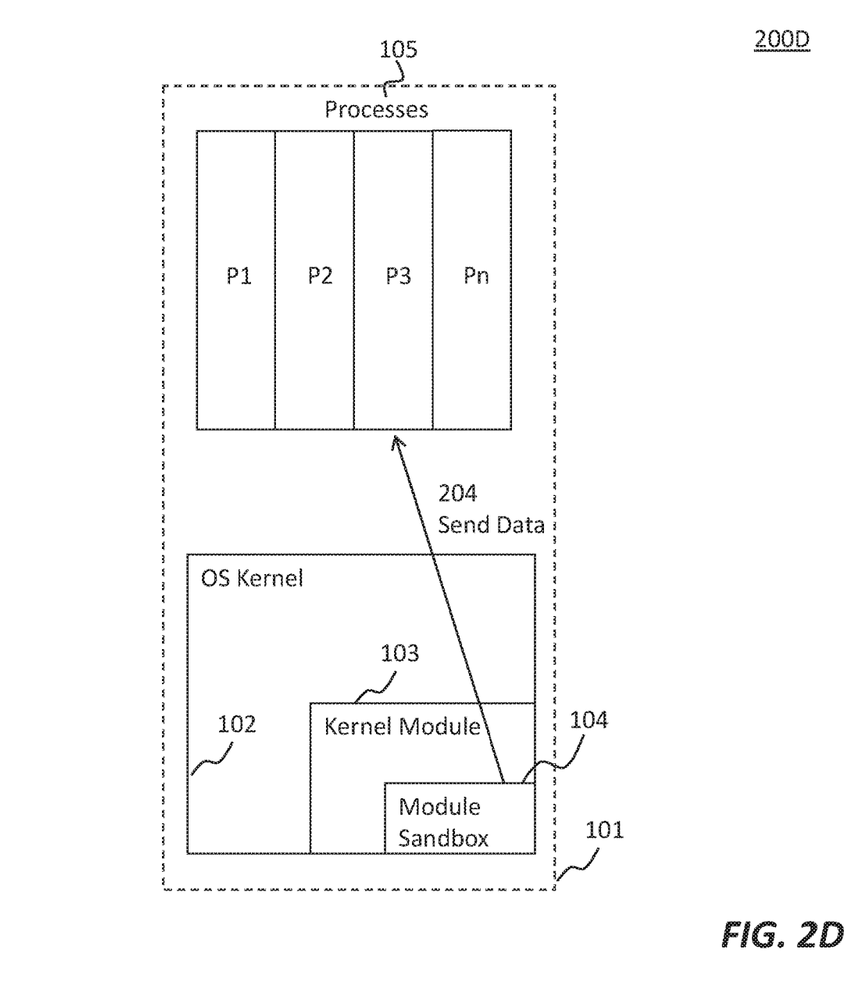
FIG. 2D is a block diagram of an exemplary system where a kernel module sandbox sends requested data to a process in accordance with disclosed embodiments.

FIG. 2D is a block diagram of an exemplary system 200D where a kernel module sandbox 104 sends requested data in operation 204 to a process P3 in accordance with disclosed embodiments. As described herein, operation 204 may be conditional on the outcome of the identify verification in operation 203. For example, if the identity of P3 is not validated in operation 203 (e.g., because process P3 has an invalid cryptographic signature, has no cryptographic signature, has an invalid hash value, or is not on a process whitelist, etc.), operation 204 may be denied by kernel module 103. On the other hand, if process P3 is successfully validated in operation 203, operation 204 may involve sending the requested data (e.g., the "cred.txt" file) to the requesting process P3. If the requested data is not encrypted, process P3 may then use the data as discussed above (e.g., to assert the credential when seeking to communicate with an external access-protected network resource). If the requested data (e.g., "cred.txt") is encrypted, operation 204 may include decrypting the data before sending it to process P3. In this manner, following the decryption, process P3 will have the cleartext version of the credential it can assert when seeking access to the remote network resource.

Figure 2E:
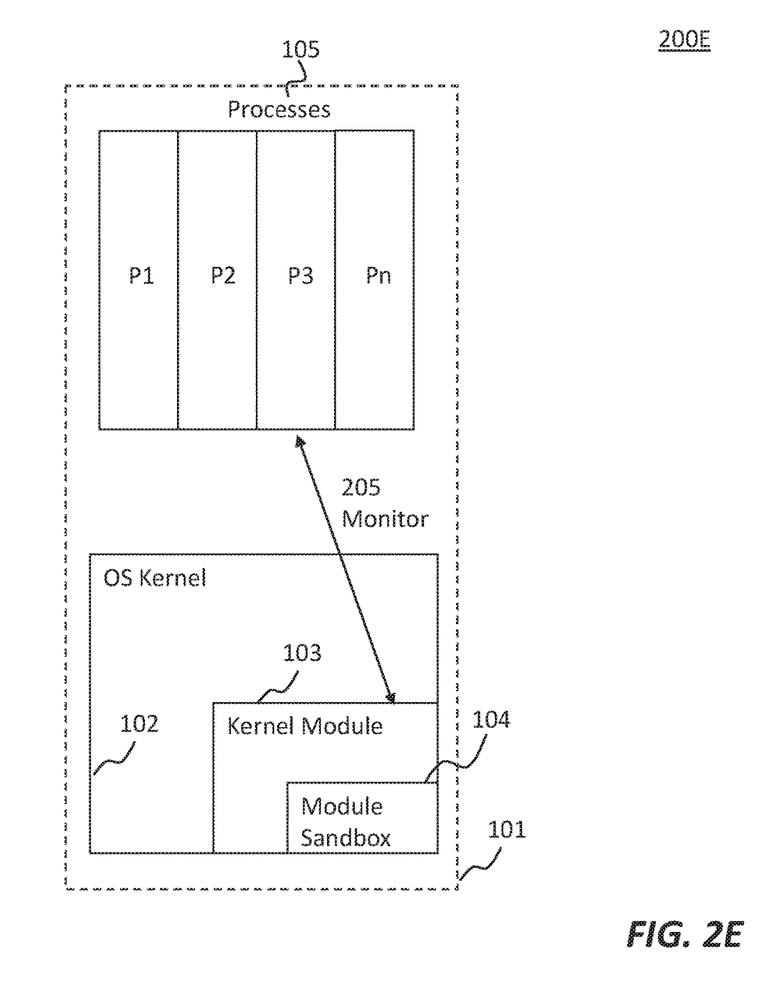
FIG. 2E is a block diagram of an exemplary system where a kernel module monitors debugging activity with respect to a process in accordance with disclosed embodiments.

FIG. 2E is a block diagram of an exemplary system 200E where a kernel module 103 monitors debugging activity in operation 205 with respect to a process P3 in accordance with disclosed embodiments. In some embodiments, operation 205 may come before operation 204. That is, kernel module 103 may monitor debugging activity in operation 205 before returning the requested data (e.g., "cred.txt") to the requesting process P3 in operation 204. If there is debugging activity detected in this situation, that may cause kernel module 103 to deny process P3 access to the requested data. Alternatively, operation 205 may occur after operation 204. For example, if in operation 204 the process P3 was provided with the requested data (e.g., "cred.txt") and used that data to access an external network resource, operation 205 may involve monitoring operation of process P3. This may be accomplished, for example, by the kernel module 103 setting a "ptrace" (process trace) system call with respect to process P3. This "ptrace" system call may enable kernel module 103 to continuously monitor process P3 in terms of its file descriptors, memory usage, and registers. In some embodiments, the "ptrace" system call may be attached to process P3 by an identity with strong (e.g., root or administrator) privileges, such as a "superuser" in a Linux or Unix environment.

By setting a "ptrace" system call, kernel module 103 can monitor whether privileged attackers are currently present on computing resource 101 and attempting to attack process P3. For example, if a privileged attacker was present on computing resource 101, they may attempt to attach their own "ptrace" system call in order to debug process P3 or accomplish a memory dump of the memory used by process P3. If an attacker was able to perform such a debugging or memory dump operation, the attacker may obtain access to the memory of process P3, and hence to the data obtained from the kernel module sandbox 104 in operation 204. As discussed above, this may include the plaintext version of the data (e.g., "cred.txt") that process P3 received from the kernel module sandbox 104. In order to guard against this opportunity for credential theft (or other sensitive data theft), the kernel module 103's own monitoring of process P3 through its attached "ptrace" system call (e.g., monitoring the "ptrace/process_vm_readv" system call for process P3 and is children) will allow kernel module 143 to determine whether any privileged attacker is attempting to access process P3 or its associated memory space. If kernel module 103 determines that a privileged attacker is indeed trying to access process P3 or its memory space, kernel module 103 may block all requests to debug process P3 or to gain access to its memory space. All such requests may be blocked by kernel module 103 until, for example, the process P3 itself and all of its children exit.

As discussed above, the operations described in connection with FIGS. 2A-2E may also be implemented to enforce a least-privilege security policy and may be performed on a JIT basis. For example, in connection with FIG. 2A, the request 201 may be a request by a process P3 (e.g., a web server process) to bind to a particular port (e.g., port 80) of computing resource 101. This request 201 (e.g., a "bind( )" system call) may ordinarily be rejected in some embodiments, however, such as embodiments where process P3 is a low-privileged identity and binding to all port numbers below number 1024 is allowed only for high-privileged identities (e.g., root, superuser, or administrator identities). In that case, ordinarily the request 201 to bind to port 80 would be denied. Nevertheless, in accordance with the above techniques it may be possible to allow process P3 to bind to port 80. For example, as discussed in connection with FIG. 2B, the request 201 may be transferred (e.g., through an operating system hook) in operation 202 to kernel module 103. Then, as discussed in connection with FIG. 2C, the identity of process P3 may be verified (e.g., based on verifying a cryptographic signature, a hash of process P3, an identification of process P3 on a whitelist, etc.) in operation 203. If the identity of process P3 is verified in operation 203 (and optionally, a confirmation is made that there is no current request to debug process P3), the process P3 may be temporarily granted elevated privileged access rights so that it can bind with port 80. This may involve, for example, elevating privileged access rights expressed in a token that process P3 asserts (e.g., replacing the token, or editing the token). The token may be, for example, a one-time use token for asserting privileged access rights. In alternative embodiments, the privilege escalation for process P3 may be accomplished by including process P3 in a privileged membership group (e.g., based on Active Directory™ or another directory service) with rights to bind to port numbers lower than 1024, or by creating a new (e.g., temporary) identity for process P3 that has such access rights. As discussed above, the specific level of privileges assigned to process P3 in this example may be defined by a least-privilege policy that states a minimum level (e.g., scope and/or duration) of privileged access rights for particular processes 105, particular tasks, particular operations, etc. Accordingly, if process P3 is validated in this example process, it may be given heightened privileged access rights on a least-privilege basis and according to a JIT (e.g., on-demand) approach. Security is thus enhanced in this technique by reducing the attack surface (in scope and time) for credential theft or data theft attacks. Further, once the process P3 exits its binding to port 80, it may revert back to its original (e.g., low level) privileges. For example, if the process P3 was given a privileged access token, and the token was one-time use only, the token may be invalidated and become unable to be used in a future binding request. Further, if the process P3 was included in a privileged group membership for purposes of binding to port 80, it may be removed from the privileged group upon exiting from its binding to port 80.

As another example of the techniques of FIGS. 2A-2E, process P3 may be associated with a cloud-native edge router, such as Traefik. In the case of Traefik, the server is loaded with a "docker.sock" mounted inside the container instance itself, which makes the container a highly privileged instance. As an illustration, the original Docker™ run command for the Traefik instance may be:

docker run -d -p 8080:8080 -p 80:80\
    -v $PWD/traefik.toml:/etc/traefik/traefk.toml\
    -v/var/run/docker.sock:/var/run/docker.sock \
    traefik:v1.7

In this example, because of the high-privilege nature of the "docker.sock" mounting, many systems will not allow mounting inside a container by default. Instead, systems may wait for an event calling a "connect( )" system call with the "docker.sock" path. When such a system call is made, consistent with above embodiments, the kernel module 103 may verify the identity of the calling process (e.g., P3), as discussed above in connection with FIGS. 2A-2E. If the process can be successfully verified (and, optionally, it is confirmed that there is no debugging in progress for the process), the kernel module 103 may allow the process to mount the "docker.sock" socket file and allow the process P3 to access the socket file. When this process is finished, the kernel module 103 may unmount the "docker.sock" socket file out of the container automatically, thus minimizing the attack surface on computing resource 101.

Figure 3:
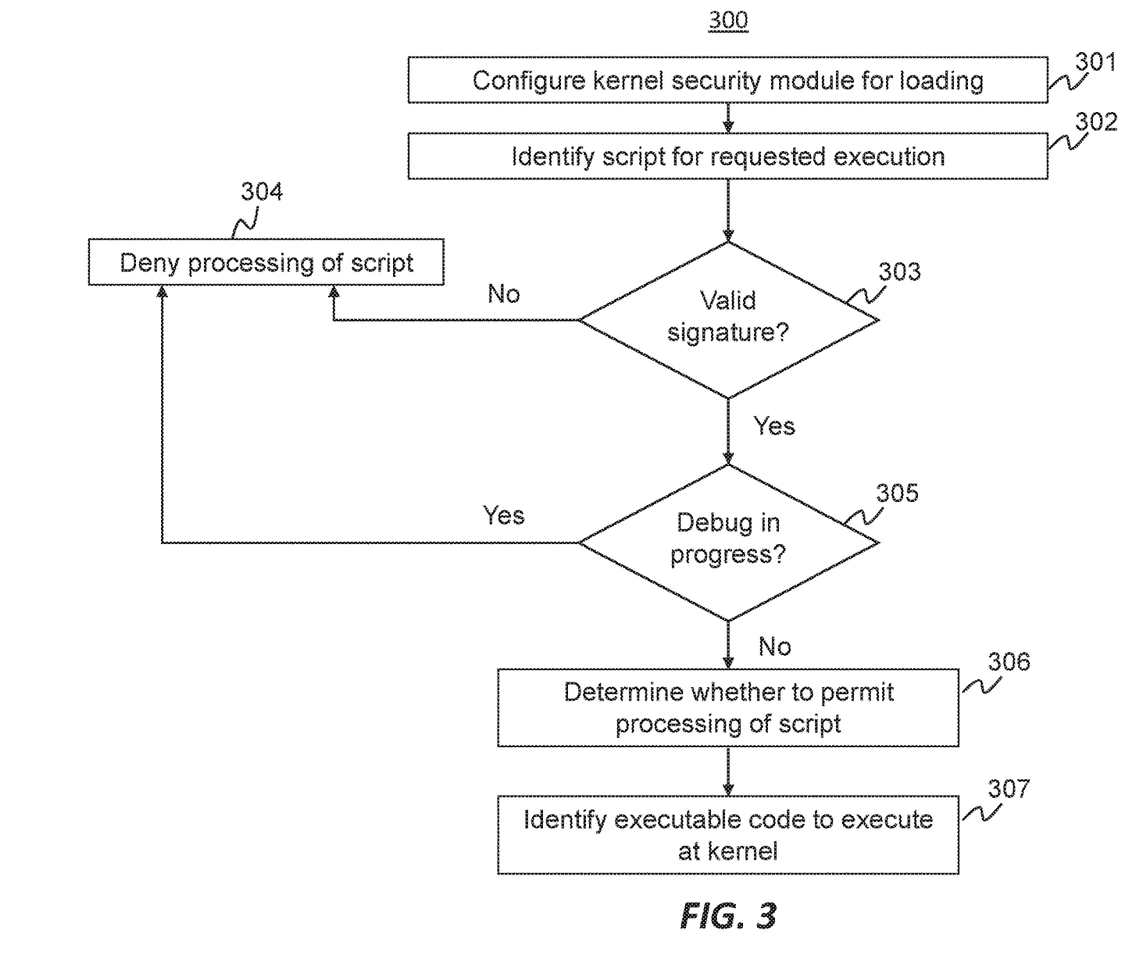
FIG. 3 is an exemplary flowchart depicting a process of secure and reliable customization of operating system kernels in accordance with disclosed embodiments.

FIG. 3 is an exemplary flowchart depicting a process 300 of secure and reliable customization of operating system kernels in accordance with disclosed embodiments. Consistent with above embodiments, process 300 may be performed in the system environments of systems 100 and 200A-200E. For example, process 300 may be carried out, in whole or part, by kernel module 103.

As illustrated, process 300 may include an operation 301 of configuring a kernel security module for loading to an operating system kernel to run kernel-level scripts on the operating system kernel. For example, as discussed above in connection with FIG. 1, kernel module 103 may be configured to load to operating system kernel 102. Kernel module 103 may then run kernel-level scripts on the operating system 102, for example, following the verification and security processes described above in connection with FIGS. 2A-2E.

In operation 302, process 300 may include identifying, at the kernel security module, a script received at the kernel security module for requested execution by the operating system kernel. For example, as discussed above, process P3 may make a request for a system call or for providing a script to operating system kernel 102. The request may be intercepted, or hooked, to kernel module 103 so that kernel module 103 (not operating system kernel 102 by itself) processes the request.

In some embodiments, operation 302 may involve associating a stored and tested (e.g., debugged and stabilized) executable command with the request from process P3. For example, as discussed above, kernel module 103 may store (e.g., in sandbox 104) defined and tested executable commands that are verified to be secure and stable. Thus, execution of such commands will not affect the stable and secure operating of operating system kernel 102. In some embodiments, the predefined and tested commands may be identified in a cross-reference table, look-up table, identified through a machine learning process, etc. Operation 302 may thus involve accessing this table, or machine learning process, and identifying a prestored and tested executable command (or commands) corresponding to the request from process P3.

As a further alternative, in some embodiments operation 302 may involve identifying a script for requested execution from among the defined and tested list of scripts maintained by kernel module 103. Thus, in such embodiments, operation 302 may involve identifying a request for execution of one of these predefined and tested scripts (e.g., identified from a cross-reference table, look-up table, machine learning technique, etc.). Alternatively, this process may occur in operation 307 (instead of operation 302), as discussed further below.

In operation 302, process 300 may include determining whether the script has a valid signature or can otherwise be identified. As discussed above, this may occur in several ways. For example, process P3 may be verified if it has a cryptographic signature that can be verified by kernel module 103. That is, if process P3 has a signature created by a public key, kernel module 103 may verify the signature using a corresponding private key that it has access to (e.g., via module sandbox 104). Alternatively, the cryptographic key may be symmetric, in which case the kernel module 103 may access the symmetric key from module sandbox 104. In further embodiments, as discussed above, the process P3 may be verified if kernel module 103 calculates a hash of the process P3 and the calculated hash is determined to match a known valid hash. In further variations, process P3 may be verified by determining whether it has a process identifier (e.g., name, number, ID, etc.) found in a whitelist maintained by kernel module 103.

If in operation 303 the signature of the process P3 is verified (or the process P3 is otherwise validated), process 300 may continue to operation 305. On the other hand, if the verification of process P3 fails in operation 303, process 300 may move to operation 304, where processing of the script is denied by kernel module 103. This may, in turn, deny processing of the script by operating system kernel 102. In some embodiments, if operation 304 is performed, process 300 may additionally generate a report, alert, or audit record identifying that processing of the script was denied. For example, the report, alert, or audit record may identify information such as the script itself, the time of the request for execution, the time of denial, the reason for denial, and various other identifying information.

If process 300 continues to operation 305, operation 305 may involve determining whether a debugging process is currently in progress with respect to process P3. For example, as discussed above in connection with FIG. 2E, kernel module 103 may attach a "ptrace" system call to be able to monitor the operations of process P3. Through this monitoring, kernel module 103 may be able to determine whether a potential attacker is concurrently attempting to debug (e.g., through their own "ptrace" system call) or otherwise access the memory being used by process P3. If it is determined in operation 305 that such a debugging or memory snooping process is currently being attempted, process 300 may revert to operation 304 of denying execution of the script. As discussed above, this may also lead to a security report, alert, or audit record regarding the denial of execution of the script.

On the other hand, if process 300 determines in operation 305 that there is currently no debugging process involving process P3, process 300 may continue to operation 306 where process 300 determines, at the kernel security module 103 and based on the security verification of operations 303 and 305, whether to permit the script to be processed by the operating system kernel 102. Consistent with the above embodiments, if the script has been successfully verified, it may then be executed regularly by operating system kernel 102. Additionally, in some embodiments as discussed above, if the script has successfully been verified, kernel security module 103 may also perform other tasks (e.g., decrypting data or credentials, and forwarding them to process P3).

In operation 307, process 300 may include identifying executable code to execute at operating system kernel 102. As discussed above, kernel module 103 may securely store (e.g., in sandbox 104) defined and tested executable commands. These commands may be verified to be safe and stable to execute at operating system kernel 102 (e.g., they will not cause crashes or errors in operating system kernel 102). Accordingly, operation 307 may include identifying executable code to run at kernel 102 through several techniques. One technique may be to identify the tested executable code through a relationship to the script identified in operation 302. For example, as discussed above, a cross-reference table, look-up table, or machine learning technique may be used by kernel module 103 to associate tested executable commands with particular scripts. As another example, in some embodiments process 300 may be performed such that the request for execution that is identified in operation 302 may itself be a request to execute one of the tested executable commands accessible to kernel module 103. Regardless of what technique is used, once the tested executable command (or commands) is identified in operation 307, it may be delivered to kernel 102 for execution. Because the executable code has been tested and determined to be stable, it may securely and stably be executed at kernel 102.

Figure 4:
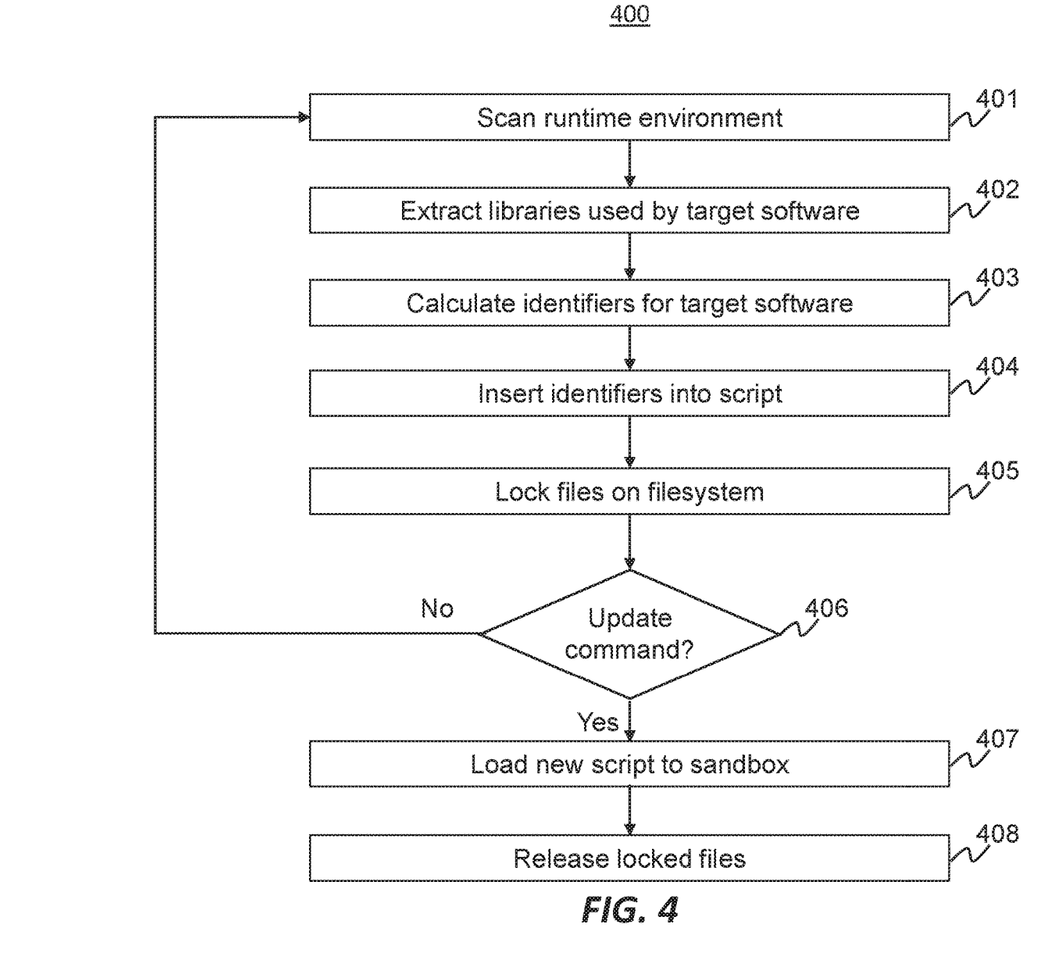
FIG. 4 is an exemplary flowchart depicting a process of securely locking and unlocking files in a filesystem using a kernel module in accordance with disclosed embodiments.

FIG. 4 is an exemplary flowchart depicting a process 400 of securely locking and unlocking files in a filesystem using a kernel module during a software update process in accordance with disclosed embodiments. Like process 300, process 400 may be implemented in the system environments of systems 100 and 200A-200E. For example, process 400 may be implemented, in whole or part, by kernel security module 103.

Process 400 may be implemented in some situations where the environment of kernel security module 103 is dynamically changing. For example, processes 105 may be added, removed, or modified on computing resource 101, and connection requests to remote network resources (e.g., instances in virtualized environment 107 and/or network resource 108) may be changing. In such a dynamic environment, there may be an identified need to update software on computing resource 101. For example, the software may have one or more processes 105, as discussed above, and may run from memory of computing resource 101 through operating system kernel 102.

Process 400 may begin in operation 401 where a scan of a runtime environment of computing resource 101 is performed. For example, the scan may identify the path on the filesystem used by a particular software application that is to be updated. Once the path on the filesystem is found through the scan in operation 401, operation 402 may include extracting all filesystem libraries that the target software uses.

In operation 403, process 400 may include calculating identifiers for the target software and all of its accompanying files. For example, this may include calculating hash values for the target software itself and the accompanying files that were extracted in operation 402. Consistent with the above discussion, the hashes may be computed in a variety of ways, such as through MD4, MD5, SHA-1, SHA-2, etc. Alternatively, in some embodiments, unique identifiers may be assigned to the target software and the extracted files rather than computed hashes. In operation 404, these identifiers may then be inserted into a script. As discussed further below, the script may be configured for performing an update to the target software.

In operation 405, process 400 includes locking all of the files on the filesystem that were extracted in operation 402. In order to lock the files (i.e., prevent their usage by operating system kernel 102), operation 405 may include disabling write or delete operations for the files. Accordingly, while the files are locked in this manner, attackers will be unable to change the files.

In operation 406, process 400 may look for an update command. For example, the update command may come from an administrator explicitly requesting that the target software be updated. Alternatively, the update command may be associated with an automatic or scheduled update process, where certain software on computing resource 101 (including the target software) is to be updated. If no update command is identified in operation 406, process 400 may loop back to an earlier operation (e.g., operation 401), in order to restart the process of scanning the runtime environment and extracting libraries associated with target software to be updated. In some embodiments, process 400 loops back to a different step rather than operation 401.

If an update command is identified in operation 406, process 400 may proceed to operation 407 of loading a new script into the module sandbox 104. The script may the script created as discussed above, so as to include the identifiers created and inserted into the script in operation 404. In accordance with operation 408, the newly uploaded script may then unlock the files that were locked in operation 405. For example, this may include the kernel security module 103 re-enabling write and delete capabilities with respect to the files that were locked. The script in the module sandbox 104 may then be released to be processed and update the target software. For example, the released script may run an "apt-get install nginx" instruction to update the target software. The script that was released may then update the target software on computing resource 101.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers; firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data; or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order; depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for secure and reliable customization of operating system kernels, the operations comprising:
   performing, at a kernel module that has been loaded to an operating system kernel to run kernel-level scripts on the operating system kernel, a security verification comprising operations of:

identifying, at the kernel module, a script received at a sandbox environment of the kernel module for requested execution by the operating system kernel, and verifying whether the script has a valid signature;

wherein the sandbox environment is a secure memory space including a set of memory locations that are exclusively assigned to the kernel module and not accessible by the operating system kernel;

determining, at the kernel module and based on the security verification, whether to permit execution of the script for running on the operating system kernel; and identifying, based on the determining, executable code corresponding to the script to execute at the operating system kernel.

2. The non-transitory computer readable medium of claim 1, wherein identifying the executable code comprises accessing a defined set of executable code maintained by the kernel module.

3. The non-transitory computer readable medium of claim 2, wherein the defined set of executable code has been debugged for stable execution at the operating system kernel.

4. The non-transitory computer readable medium of claim 1, wherein the kernel module further performs operations of:

identifying a software update process for target software configured for execution on the operating system kernel; and locking at least a portion of a memory used by target software during the software update process.

5. The non-transitory computer readable medium of claim 4, wherein the kernel module further performs operations of: determining a level of privileged access associated with the target software; and applying a least-privilege policy to lower the level of privileged access associated with the target software.

6. The non-transitory computer readable medium of claim 5, wherein applying the least-privilege policy includes provisioning a privileged access credential to the target software.

7. The non-transitory computer readable medium of claim 5, wherein applying the least-privilege policy includes including an identity associated with the target software in a privileged membership group.

8. The non-transitory computer readable medium of claim 4, wherein the kernel module further performs operations of determining whether to allow the target software to access a requested file in a filesystem associated with the operating system kernel.

9. The non-transitory computer readable medium of claim 1, wherein the operations further comprise:

identifying a request from a new script to bind to a restricted port number associated with the operating system kernel;

performing a security verification for the new script; and allowing, on a just-in-time basis and based on a result of the security verification, the request to bind to the restricted ported number.

10. The non-transitory computer readable medium of claim 9, wherein the operations further comprise:

identifying a termination of the binding to the restricted port number; and reverting to a default state where requests to bind to the restricted port number are denied.

11. A computer-implemented method for secure and reliable customization of operating system kernels, the method comprising:

performing, at a kernel module that has been loaded to an operating system kernel to run kernel-level scripts on the operating system kernel, a security verification comprising operations of:

identifying, at the kernel module, a script received at a sandbox environment of the kernel module for requested execution by the operating system kernel, and verifying whether the script has a valid signature;

wherein the sandbox environment is a secure memory space including a set of memory locations that are exclusively assigned to the kernel module and not accessible by the operating system kernel;

determining, at the kernel module and based on the security verification, whether to permit execution of the script for running on the operating system kernel; and identifying, based on the determining, executable code corresponding to the script to execute at the operating system kernel.

12. The computer-implemented method of claim 11, wherein verifying whether the script has the valid signature includes accessing a cryptographic key maintained by the kernel module and attempting to decrypt at least a portion of the script.

13. The computer-implemented method of claim 11, further comprising, conditional on the security verification, determining whether to decrypt encrypted data associated with the script.

14. The computer-implemented method of claim 13, wherein the encrypted data is an encrypted version of a privileged access credential.

15. The computer-implemented method of claim 14, further comprising providing a decrypted version of the encrypted data to the script.

16. The computer-implemented method of claim 11, further comprising identifying a request to debug the script and blocking the request.

17. The computer-implemented method of claim 11, further comprising identifying a port number of the operating system kernel associated with the requested execution and determining whether the identified port number is within a restricted range.

18. The computer-implemented method of claim 17, further comprising blocking execution of the process by the operating system kernel when the identified port number is within the restricted range.

19. The computer-implemented method of claim 11, further comprising performing the security verification on a just-in-time basis.

20. The computer-implemented method of claim 19, wherein performing the security verification on the just-in-time basis includes performing at least one of: creating an account, changing the script's attributes, obtaining privileged access rights for the script, or lowering privileged access rights for the script.

* * * * *